United States Patent [19]

Siebert et al.

[11] Patent Number: 4,906,807
[45] Date of Patent: Mar. 6, 1990

[54] APPARATUS FOR MONITORING THE FLOW OF FLUID MEDIA IN A PIPELINE

[75] Inventors: Christian Siebert, Kassel; Jurgen Sommer, Kaufungen, both of Fed. Rep. of Germany

[73] Assignee: Dr. Siebert & Kuhn GmbH & Co. KG, Kaufungen, Fed. Rep. of Germany

[21] Appl. No.: 275,006

[22] Filed: Nov. 22, 1988

[30] Foreign Application Priority Data

Nov. 30, 1987 [DE] Fed. Rep. of Germany ... 8715831[U]
Dec. 7, 1987 [DE] Fed. Rep. of Germany ... 8716152[U]
Apr. 13, 1988 [DE] Fed. Rep. of Germany ... 8804848[U]

[51] Int. Cl.$^4$ ............................................. H01C 35/40
[52] U.S. Cl. .......................... 200/81.9 M; 200/302.1; 73/861.75; 340/610
[58] Field of Search ................ 307/118; 340/610, 625; 335/205; 200/81 R, 81.9 R, 81.9 M, 82 E, 83 W, 84 C, 84 B, 302.1, 302.3; 73/861.75, 861.76, 861.77, 308, 317

[56] References Cited

U.S. PATENT DOCUMENTS

| | | | |
|---|---|---|---|
| 3,569,648 | 3/1971 | De Meyer | 200/81.9 M |
| 3,749,864 | 7/1973 | Tice | 200/81.9 M |
| 4,136,330 | 1/1979 | Estaque | 340/610 |
| 4,725,700 | 2/1988 | Zoludow | 200/302.1 |

FOREIGN PATENT DOCUMENTS

2744901 4/1979 Fed. Rep. of Germany ..... 200/81.9 M
1186300 4/1970 United Kingdom .......... 200/81.9 M Primary Examiner—Gerald P. Tolin
Attorney, Agent, or Firm—Collard, Roe & Galgano

[57] ABSTRACT

An apparatus for monitoring the flow of fluid in the pipeline has a hollow housing with a control element movably supported therein. The control element is movable under the action of the fluid flow, from an initial position to a position triggering a switching operation and is biased towards its initial position by a biasing system. A support ring is fixedly coupled to an inner wall of the hollow housing and has a central opening therein. The control element is composed of a connecting element which extends through the wall of the pipeline and through the central opening in the housing, which connecting element has a first end coupled to a magnet and a second end connected to a flow deflecting body. The connecting element is pivotably mounted to the support ring about an axle extending therethrough. A flow diverter or a seal assembly is utilized for preventing fluid flow from the pipeline from going around the connecting element and through the central opening into the housing interior.

19 Claims, 2 Drawing Sheets

APPARATUS FOR MONITORING THE FLOW OF FLUID MEDIA IN A PIPELINE

BACKGROUND OF THE INVENTION

1. Field of the Invention

The invention relates to an apparatus for monitoring the flow of liquid or gaseous media in a pipeline, consisting of a casing and a control element for triggering various switching operations, which element is movably supported in the casing against a resetting force.

2. Description of the Prior Art

Flow monitoring devices which may be installed in or mounted on pipelines serve the purpose of triggering a switching function if either a predetermined amount of flow through the pipe is exceeded or if an insufficient flow condition exists. For this purpose, a deflecting or floating body is movably arranged in the fluid flow path and is pivoted or displaced, depending on the given amount of through-flow. A switch is actuated when a predetermined flow condition is reached, either directly by mechanical means, or in a contactless manner, for example, capacitatively or inductively.

A flow monitor disclosed in German Patent DE-83 06 892 teaches that when the deflecting body is pivoted by the flow medium, its position may be monitored by the magnetic force generated by two counterpoled magnets. In this prior art monitoring device, a magnet is mounted at one end of the flow-deflecting body and a corresponding opposite pole magnet is mounted in the hollow housing or casing of the apparatus. This means that in this known device, the resetting force is not produced by a return spring, as is the case in many of the prior art devices. Use of a return spring has the disadvantage that it is highly dependent upon external influences with respect to its switching behavior. The switching behavior of magnetic forces, on the other hand, remains constant over long periods of time.

However, even with an embodiment using magnetic switches, it has not been possible to prevent the flow monitor function from deteriorating even after a short period of operation. The temperature difference between the hot medium flowing in the pipeline and the relatively cool medium in the hollow housing produces a suction between the pipe or conduit and the housing or casing. This causes a constant exchange or flow medium between the conduit and the casing interior. This results in, particularly if the flow medium is water containing lime, zinc carbonates being deposited in the bearing for that portion of the deflecting body arranged in the casing. These deposits interefere to a great extent with the mobility of the deflecting body, even after a short period of operation, so that it is no longer possible to reach a preset switching point. Furthermore, magnetic particles carried along by the flow medium penetrate the casing and adversely influence the switching behavior because these particles are deposited on the magnets.

SUMMARY OF THE INVENTION

It is an object of the present invention to provide an apparatus for monitoring the flow of liquid or gaseous media that assures a stable switching behavior over long periods.

It is yet another object of the invention to provide an apparatus in which the switching point remains constant, is highly sensitive to flow measurements and other useful engineering measurement-parameters and in which the constant exchange of the medium between the pipeline and the casing or housing is avoided.

It is yet another additional object to provide an apparatus which is simple in design, easy to install, and economical to manufacture.

Accordingly, these and related objects are achieved by a control element movably supported in a hollow housing or casing by means of a support ring. A flow inhibitor or diverter is arranged below the support ring on the side thereof toward the flow medium. In this way, only a minimal exchange of fluid takes place between the casing interior and the pipeline, which prevents the formation of the aforementioned damaging deposits. In addition, dirt particles, and in particular iron or salt particles, cannot migrate from the flow medium into the casing.

According to a particularly advantageous embodiment of the invention, the control element consists of a connecting element in the form of a lever having a deflecting body in the form of a plate or ball at the end thereof towards the fluid flow side. The lever has a magnet at its other end. With this embodiment, the magnet serves the purpose of initiating certain switching operations, for example, on a reed switch. However, the magnet may also have an additional function, i.e., the function of building up a magnetic force in cooperation with a second counterpoled magnet (counter magnet) arranged in the casing or mounted to an outer wall of the casing. This magnetic force represents the resetting or biasing force, against which the lever is pivoted by the flow of the medium.

A change in the density or viscosity of the flow medium may make it necessary to adjust the resetting force and thus the switching time accordingly. According to a special feature of the invention, this is accomplished by making the distance between the two magnets adjustable. For this purpose, the counter magnet is arranged in a bore of a ring placed around the casing. The distance between the two magnets is now variable by either displacing the ring with the counter magnet on the outer wall or the casing, or by displacing the counter magnet itself in the bore of the ring.

According to another feature of the invention, the control element and the support ring are made from a plastic material, preferably from a hard plastic material. This embodiment offers additional safety against deposits of zinc carbonates between the connecting element and the support ring. In addition, the suction effect between the pipeline and the casing is reduced because the plastic control element has a lower thermal conductivity, and thus the medium is heated less in the casing. Making the control element from a plastic material has the additional advantage that the control element responds to flow changes more readily because it weighs less than a control element made from metal.

According to a preferred embodiment, the flow inhibitor is made in the form of a ring having a notch extending around the outer circumference of the ring. The exchange of liquid between the pipeline and the casing is avoided for the most part with this type of flow inhibitor because the shape of the notch extending around the ring diverts flow away from the opening in the pipe wall through which the connecting element passes. In order to assure a rigid seat, the ring is disposed in a groove extending entirely around the connecting element shaft.

According to another embodiment, the flow inhibitor is in the form of a flexible disk, corresponding in size approximately with the diameter of the support ring. This flexible disk is made from a soft plastic material, preferably from silicon rubber. According to a special feature of this embodiment, the disk is part of a sealing unit comprised of the support ring, a counter disk made from hard plastic material, and an 0-ring supported in a circular groove arranged on the counter disk. For the purpose of pressure compensation, the flexible disk has a small hole. The sealing unit prevents the fluid flow from the pipeline into the hollow interior of the housing.

According to additional features of the invention, the support ring is pivotably connected with the connecting element or lever by a pivot pin or axle, whereby the opening in the support ring for the lever is conical, at least on one side, and preferably on both sides, in order to assure the free movement of the lever in the support ring. The axle itself is supported in a sleeve made of tetrafloroethylene, such as that sold under the Dupont trademark TEFLON.

These and other objects and advantages of the present invention will become apparent from the following description of the accompanying drawings, which disclose several embodiments of the invention. It is to be understood that the drawings are to be used for the purposes of illustration only, and not as a definition of the invention.

BRIEF DESCRIPTION OF THE DRAWINGS

Further advantages and details can be gleaned from the drawings wherein similar reference numerals denote similar elements throughout the several views.

DESCRIPTION OF THE PREFERRED EMBODIMENTS

Figure 1:
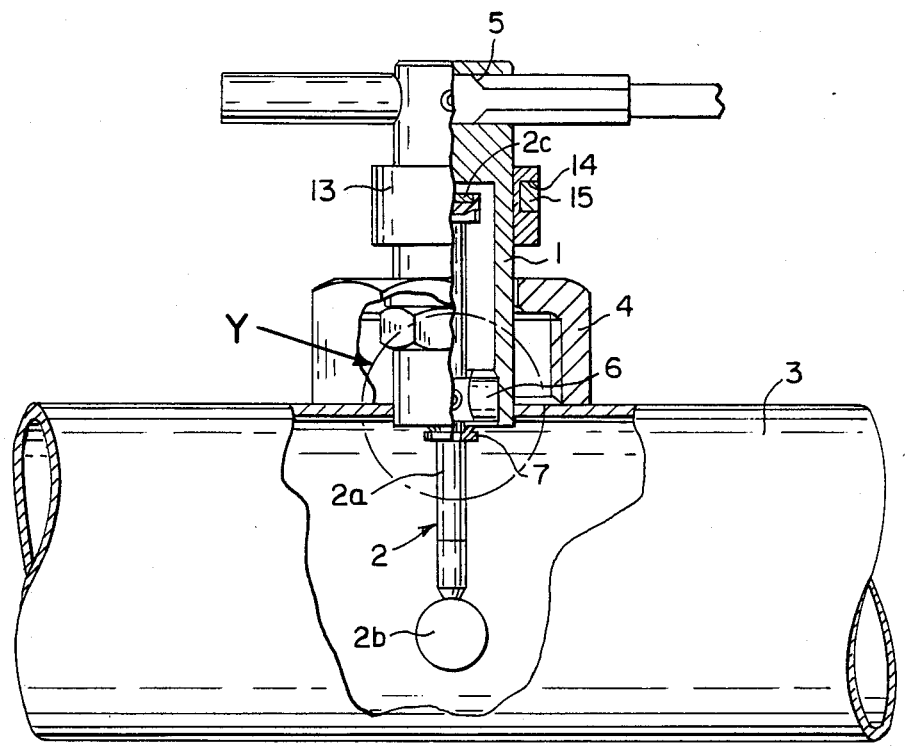
FIG. 1 is a first embodiment with a flow inhibitor in the form of a flow diverter ring.
Figure 4:
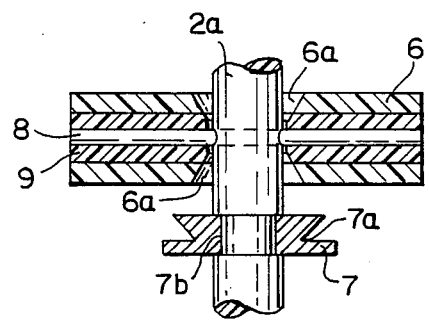
FIG. 4 is an enlarged view of detail "Y" of FIG. 1 rotated 90 degrees.

Referring to FIGS. 1 and 4, there is shown a hollow housing or casing 1, with the control element as a whole denoted by reference numeral 2. Casing 1 is rigidly joined with the pipe or conduit 3, through which the fluid medium flows, by a nut 4 and, consequently, casing 1 is disposed outside pipe 3. Control element 2 consists of a lever or connecting element 2a having a flow deflecting body 2b in the form of a movable plate or a movable ball at its end on the side towards the flow. Using a ball has an advantage over a plate in that the ball reacts more rapidly to flow changes due to the higher buoyancy resulting from the use of plastic material, for example polyvinyldichloride (PVDF). Lever 2a, with the plate or ball extends into conduit 3 through which the fluid medium is flowing. A magnet 2c is disposed at the other end of the lever 2a, and cooperates with an electrical switch 5. Switch 5 is normally a reed relay switch arranged above the magnet 2c in a capsule held in casing 1. Pneumatic type switches may also be used, particularly if sparking is to be avoided.

A ring 13 with a bore 14 for receiving a counter magnet 15 is mounted around casing 1. Magnet 15 cooperates with magnet 2c. The distance between the two opposite poles of magnets 2c, 15 and thus the magnitude of the resetting force is varied by displacing ring 13 on the casing. This permits adapting the exact switching point to the density or viscosity of the flow medium. The distance between the two magnets may also be changed by displacing counter magnet 15 in bore 14.

Lever 2a of the control element 2 is supported by support ring 6, which is rigidly connected with casing 1, for example, by a press fit. Viewed from the center of conduit 3, i.e., towards the side facing the flow in the pipe, the flow inhibitor 7 is disposed below the support ring 6. Flow inhibitor 7 is substantially ring shaped. However, the ring has a notch 7a extending across its outer circumference. This notch produces a flow pattern which almost completely excludes any exchange of medium between the conduit and the casing. Flow inhibitor 7 is supported on the lever 2a in groove 7b. The axle or pivot pin 8, which rigidly connects support ring 6 with the lever, is supported in a plastic sleeve 9. Furthermore, bore 6a of support ring 6 is conical on both sides in order to assure the mobility of the connecting element or lever without requiring an excessively large opening for receiving lever 2a within support ring 6.

Figure 2:
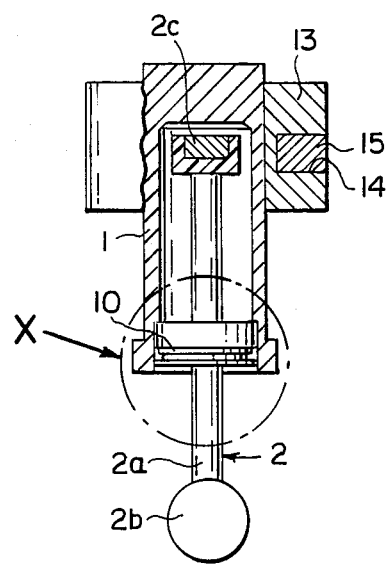
FIG. 2 is a second embodiment, in which the flow inhibitor is in the form of a sealing disk.
Figure 3:
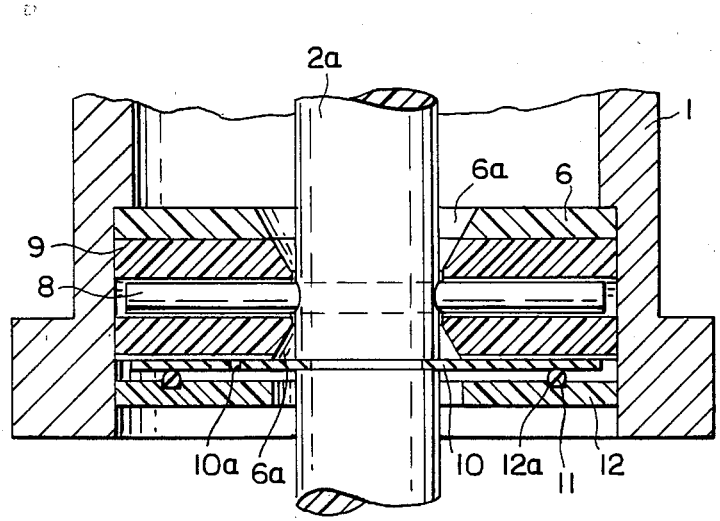
FIG. 3 is an enlarged view of detail "X" of FIG. 2.

Referring to FIGS. 2 and 3, there is shown a second embodiment of the invention which is basically identical with the embodiment shown in FIG. 1 with respect to control element 2 and the casing 1, but which utilizes a different method to prevent fluid medium from entering the casing. In FIG. 2, reference numeral 1 again denotes the casing, and 2a the lever or the connecting element of the control element. Lever 2a, in this case, is also connected to support ring 6 by axle 8. Axle 8 is rotatably supported in a plastic sleeve 9, preferably made from TEFLON. Beneath the support ring 6, flexible disk 10, which is made from silicone rubber, is seated in a groove on the circumference of lever 2a. An O-ring 11 is supported in a groove 12a arranged in counter disk 12. O-ring 11, along with disk 10, form a sealing unit, in which flexible disk 10 represents the flow inhibitor. In this embodiment, counter disk 12 is press fit into casing 1. In addition, flexible disk 10 has a small hole 10a for purposes of pressure compensation between the interior of pipe or conduit 3 and the interior of casing 1.

While only two embodiments and examples of the present invention have been illustrated and described, it is obvious that many changes and modifications may be made thereunto, without departing from the spirit and scope of the invention.

What is claimed is:

1. In an apparatus for monitoring the flow of fluid in a pipeline, said apparatus having a hollow housing mounted on an outer wall of the pipeline with a control element movably supported therein, the control element being movable from an initial position to a position triggering a switching operation and being biased toward its initial position by a biasing means, the improvement comprising:

a support ring fixedly coupled to an inner wall of the hollow housing and having a central opening therein;

a connecting element extending through a wall of the pipeline and through said central opening into the housing, said connecting element having a first end connected to a flow deflecting body to form the control element;

means pivotably mounting said connecting element to said support ring; and means for inhibiting fluid flow from said pipeline and through said central opening into said housing, said means being mounted on said connecting element in front of said central opening so that a controlled minimal of fluid takes place between said pipeline and the interior of said housing.

2. An apparatus, as set forth in claim 1, wherein the connecting element has a magnet mounted at a second end thereof.

3. The apparatus as set forth in claim 2, further including a counter magnet mounted on an outer wall of said hollow housing at a free end thereof.

4. The apparatus as defined in claim 3, wherein a ring in which said counter magnet is housed surrounds said outer wall of said housing, said counter magnet being movable with respect to the interior of said housing in a direction generally perpendicular to a longitudinal axis of said housing.

5. An apparatus as set forth in claim 1, wherein the connecting element is a generally cylindrical shaft forming a lever pivotably connected to said support ring.

6. The apparatus as set forth in claim 5, wherein the means for inhibiting flow is a ring-shaped flow diverter element coupled to said shaft intermediate the deflecting body and the pipeline wall for diverting flow away from said central opening.

7. The apparatus as set forth in claim 6, wherein said ring-shaped element is seated in a groove extending around the shaft of the lever.

8. The apparatus as set forth in claim 1, wherein said connecting element and said support ring are made of a hard plastic material.

9. The apparatus as set forth in claim 1, wherein the means for inhibiting fluid flow is a flexible disk having a diameter generally equal to the diameter of the support ring and extending within said hollow housing at an end thereof facing the fluid flow.

10. The apparatus as set forth in claim 9, wherein said flexible disk is made of a silicone rubber.

11. The apparatus as set forth in claim 10, wherein said flexible disk is part of a sealing unit comprising said support ring, a counter disk extending within said hollow housing and mounted between said flexible disk and the fluid flow in the pipeline, and an O-ring supported in a circular groove arranged on said counter disk on a surface facing said flexible disk.

12. The apparatus as set forth in claim 10, wherein said flexible disk has a hole therein communicating between a side facing the flow and a side facing the housing interior.

13. The apparatus as set forth in claim 1, wherein said support ring has a bore therein for receiving the lever, said bore being conical at least on one side.

14. The apparatus as set forth in claim 13, wherein the means for pivotably mounting said connecting element is an axle supported in a plastic sleeve arranged in said bore of said support ring.

15. The apparatus as set forth in claim 1, further including means for varying the biasing force.

16. The apparatus as set forth in claim 1, wherein said deflecting body is a movable plate.

17. The apparatus as set forth in claim 1, wherein said deflecting body is a movable ball.

18. The apparatus as set forth in claim 2, wherein said magnet actuates a switch located in a free end of the housing.

19. The apparatus as set forth in claim 18, wherein the switch is an electric switch.

* * * * *